(12) United States Patent
Vignon et al.

(10) Patent No.: US 8,477,134 B1
(45) Date of Patent: *Jul. 2, 2013

(54) CONSERVATIVE TRIAGE OF POLYGON STATUS USING LOW PRECISION EDGE EVALUATION AND HIGH PRECISION EDGE EVALUATION

(75) Inventors: Blaise Vignon, Stanford, CA (US); Franklin C. Crow, Portola Valley, CA (US)

(73) Assignee: Nvidia Corporation, Santa Clara, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 11/479,617

(22) Filed: Jun. 30, 2006

(51) Int. Cl.
*G06T 15/40* (2011.01)

(52) U.S. Cl.
USPC .......................................... 345/421; 345/422

(58) Field of Classification Search
None
See application file for complete search history.

(56) References Cited

U.S. PATENT DOCUMENTS

| | | |
|---|---|---|
| 5,452,412 A | 9/1995 | Johnson, Jr. et al. |
| 5,594,854 A | 1/1997 | Baldwin et al. |
| 5,623,692 A | 4/1997 | Priem et al. |
| 5,664,162 A | 9/1997 | Dye |
| 5,854,631 A | 12/1998 | Akeley et al. |
| 5,854,637 A | 12/1998 | Sturges |
| 5,977,987 A | 11/1999 | Duluk, Jr. |
| 6,028,608 A | 2/2000 | Jenkins |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,188,394 B1 | 2/2001 | Morein et al. |
| 6,201,545 B1 | 3/2001 | Wong et al. |
| 6,204,859 B1 | 3/2001 | Jouppi et al. |
| 6,249,853 B1 | 6/2001 | Porterfield |
| 6,359,623 B1 * | 3/2002 | Larson ......................... 345/501 |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 * | 8/2002 | Baltaretu et al. .............. 345/423 |
| 6,452,595 B1 | 9/2002 | Montrym et al. |
| 6,469,707 B1 | 10/2002 | Voorhies |
| 6,480,205 B1 | 11/2002 | Greene et al. |
| 6,504,542 B1 | 1/2003 | Voorhies et al. |
| 6,529,207 B1 | 3/2003 | Landau et al. |

(Continued)

OTHER PUBLICATIONS

Foley, J. "Computer Graphics: Principles and Practice", 1987, Addison-Wesley Publishing, 2nd Edition, p. 545-546.

(Continued)

*Primary Examiner* — Daniel Hajnik (57) ABSTRACT

In a raster stage of a graphics processor, a method for using low precision evaluation and high precision evaluation for conservative triage of polygon status. The method includes receiving a graphics primitive for rasterization in a raster stage of a graphics processor and rasterizing the graphics primitive to generate a plurality of tiles of pixels related to the graphics primitive. The tiles are rasterized at a first level precision to generate a plurality of sub-tiles related to the graphics primitive, wherein the sub-tiles are evaluated against the graphics primitive at each of their respective corners. Each of the sub-tiles not related to the graphics primitive are discarded. The sub-tiles related to the graphics primitive are rasterized at a second level precision.

14 Claims, 8 Drawing Sheets

U.S. PATENT DOCUMENTS

| | | |
|---|---|---|
| 6,614,444 B1 | 9/2003 | Duluk, Jr. et al. |
| 6,624,823 B2 * | 9/2003 | Deering ........................ 345/613 |
| 6,633,197 B1 | 10/2003 | Sutardja |
| 6,633,297 B2 | 10/2003 | McCormack et al. |
| 6,646,639 B1 | 11/2003 | Greene et al. |
| 6,717,576 B1 | 4/2004 | Duluk, Jr. et al. |
| 6,717,578 B1 | 4/2004 | Deering |
| 6,734,861 B1 * | 5/2004 | Van Dyke et al. ............ 345/506 |
| 6,741,247 B1 | 5/2004 | Fenney |
| 6,765,575 B1 * | 7/2004 | Voorhies et al. .............. 345/441 |
| 6,778,177 B1 | 8/2004 | Furtner |
| 6,798,410 B1 | 9/2004 | Redshaw et al. |
| 6,833,835 B1 | 12/2004 | van Vugt |
| 6,947,057 B2 | 9/2005 | Nelson et al. |
| 7,064,771 B1 | 6/2006 | Jouppi et al. |
| 7,119,809 B1 | 10/2006 | McCabe |
| 7,158,148 B2 | 1/2007 | Toji et al. |
| 7,382,368 B1 | 6/2008 | Molnar et al. |
| 7,551,174 B2 | 6/2009 | Iourcha et al. |
| 7,791,617 B2 | 9/2010 | Crow et al. |
| 8,063,903 B2 | 11/2011 | Vignon et al. |
| 2002/0050979 A1 | 5/2002 | Oberoi et al. |
| 2002/0097241 A1 | 7/2002 | McCormack et al. |
| 2002/0140655 A1 | 10/2002 | Liang et al. |
| 2003/0122815 A1 * | 7/2003 | Deering ........................ 345/419 |
| 2004/0246251 A1 * | 12/2004 | Fenney et al. ................. 345/426 |
| 2005/0030314 A1 | 2/2005 | Dawson |
| 2005/0041037 A1 * | 2/2005 | Dawson ........................ 345/611 |
| 2005/0134603 A1 | 6/2005 | Iourcha et al. |
| 2005/0179698 A1 * | 8/2005 | Vijayakumar et al. ........ 345/611 |
| 2005/0259100 A1 | 11/2005 | Teruyama |
| 2006/0170690 A1 * | 8/2006 | Leather ........................ 345/506 |
| 2007/0139440 A1 | 6/2007 | Crow et al. |
| 2007/0292022 A1 | 12/2007 | Nilsson et al. |

OTHER PUBLICATIONS

Fuchs, "Fast Spheres Shadow, Textures, Transparencies, and Image Enhancements in Pixel-Planes"; ACM; 1985; Department of Computer Science, University of South Carolina at Chapel Hill, Chapel Hill, NC 27514.

* cited by examiner

CONSERVATIVE TRIAGE OF POLYGON STATUS USING LOW PRECISION EDGE EVALUATION AND HIGH PRECISION EDGE EVALUATION

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a vertex, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to a display buffer representing each pixel.

Various traversal algorithms and various rasterization methods have been developed for computing from a graphics primitive based description to a pixel based description (e.g., rasterizing pixel-to-pixel per primitive) in a way such that all pixels within the primitives comprising a given 3-D scene are covered.

Typical solutions involve generating pixels in a unidirectional manner by systematically stepping across a scene (e.g., from left to right) line by line, and visiting each pixel of the scene. A degree of coverage for each pixel is determined as per the contribution of the various primitives comprising the scene. Other traditional solutions involve utilizing per pixel evaluation techniques to closely evaluate each of the pixels comprising a display and determine which pixels are covered by which primitives.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920× 1200 pixels or larger. The prior art rasterization solutions are increasingly becoming a bottleneck to the 3-D rendering process. As display screens inexorably increase in size, for example, to 1920 pixels wide and larger, the prior art line-by-line stepping and per pixel evaluation solutions for rasterization increasingly need larger resources to handle the computational loads. To handle such large screen sizes, the rasterization resources of a GPU needs to handle a large number of per primitive evaluation operations (e.g., polygon edge equations) on a per clock cycle basis, and the per primitive evaluation operations are required to address a correspondingly large number pixels. Thus, typical prior art GPUs do not have adequate rasterization resources to scale to large screen sizes while maintaining acceptable real-time 3-D rendering performance.

Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties, such as increased power consumption and/or reduced fabrication yield.

In one embodiment, the present invention is implemented as a method for using low precision evaluation and high precision evaluation for conservative triage of polygon status. The method includes receiving a graphics primitive (e.g., a triangle polygon) for rasterization in a raster stage of a graphics processor and rasterizing the graphics primitive to generate a plurality of tiles of pixels related to the graphics primitive. In one embodiment, the tiles are comprised of pixels (e.g., 8×8, 16×16, 32×32 pixels, etc.). The tiles are rasterized at a first level precision (e.g., a low precision polygon edge equation evaluation) to generate a plurality of sub-tiles related to the graphics primitive (e.g., at least partially covered), wherein the sub-tiles are evaluated against the graphics primitive at each of their respective corners. In one embodiment, each tile comprises four sub-tiles (e.g., four 4×4 sub-tiles per 8×8 tile, etc.). Each of the sub-tiles not related to the graphics primitive (e.g., completely uncovered) are discarded. The sub-tiles related to the graphics primitive (e.g., at least partially covered) are rasterized at a second level precision (e.g., a high precision polygon edge equation evaluation).

In one embodiment, sub-tiles that are completely covered are output (e.g., expedited) for rendering operations at a subsequent stage of the graphics processor without undergoing rasterization at the second level. In one embodiment, the first level precision is truncated to ensure a conservative evaluation of the sub-tiles with respect to coverage by the graphics primitive.

In this manner, low precision edge evaluation can be used to rapidly identify those sub-tiles which are completely uncovered and those sub-tiles which are completely covered, which can then be expedited to subsequent rendering stages. Partially covered sub-tiles can be reliably identified and fully evaluated using high precision edge evaluation. The use of low precision edge evaluation reduces the amount of GPU hardware required for a given level of rasterization performance. Similarly, the use of low precision edge evaluation in accordance with embodiments of the present invention provides a rasterization process that can scale as graphics application needs require and provides added performance without incurring penalties such as increased power consumption and/or reduced fabrication yield.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
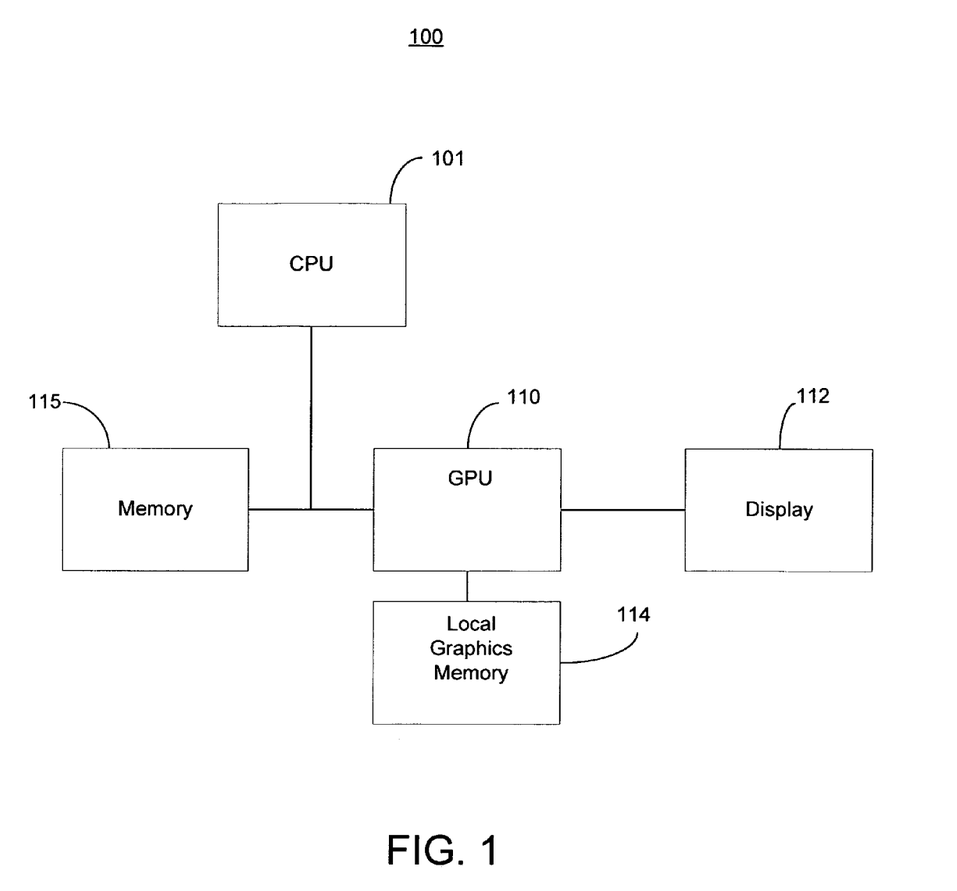
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

EMBODIMENTS OF THE INVENTION

Figure 2:
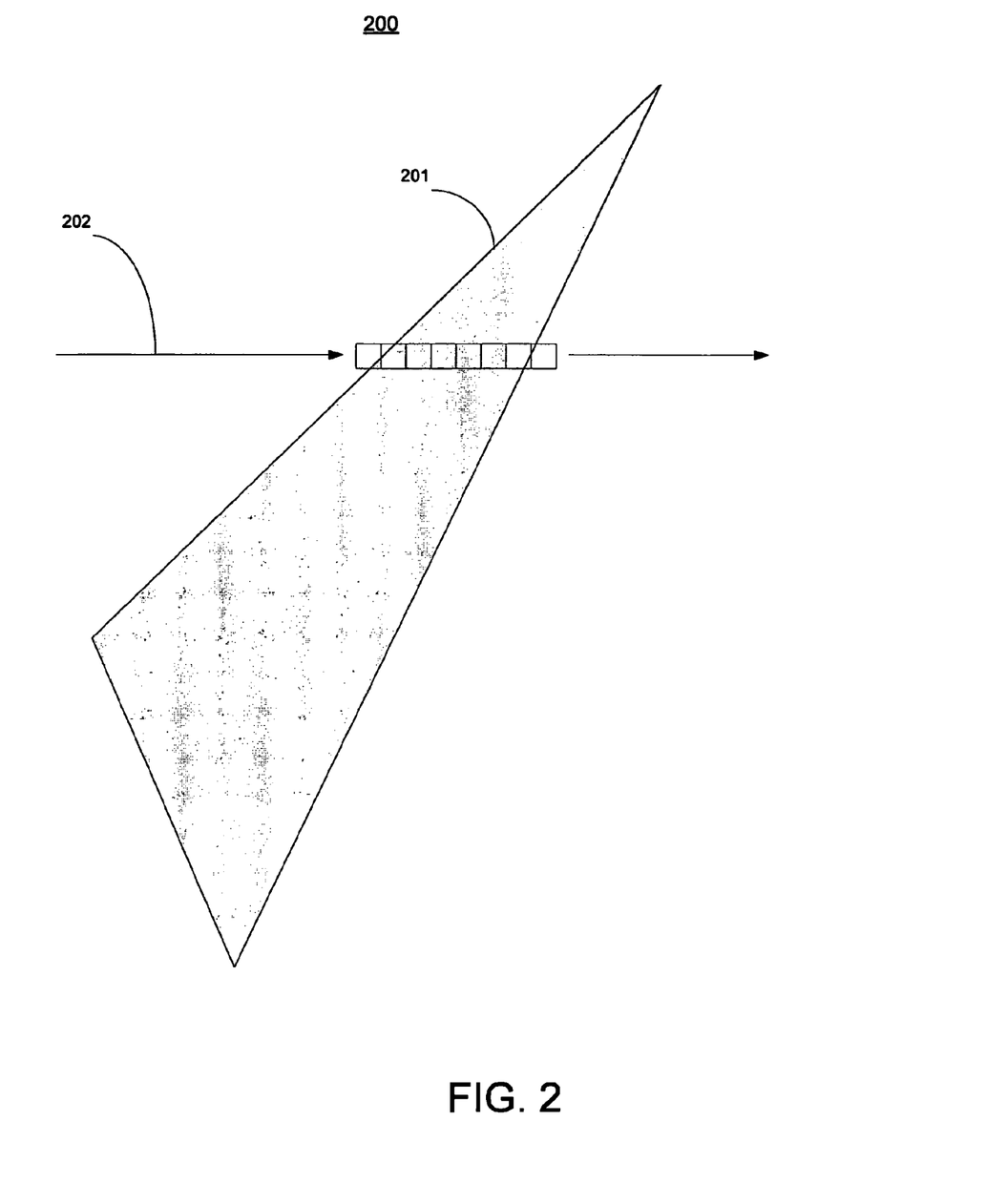
FIG. 2 shows a diagram depicting a polygon for rasterization in accordance with one embodiment of the present invention.

FIG. 2 shows a diagram 200 depicting a polygon 201 during a rasterization process in accordance with one embodiment of the present invention.

As shown in FIG. 2, during the rasterization process, the coverage of a polygon, in this case the triangle 201, is broken down into its prospective contributions over individual portions of one or more tiles, where each tile itself is composed of a plurality of pixels (e.g., 32×32 pixels per tile, 16×16 pixels per tile, 8×8 pixels per tile, or the like). FIG. 2 shows the triangle 201 and the covered tiles generated along the line of rasterization 202 in accordance with one embodiment of the present invention.

Embodiments of the present invention implement a method and system for using low precision evaluation and high precision evaluation for conservative triage of polygon status. The method includes receiving a graphics primitive (e.g., a triangle polygon) for rasterization in a raster stage of a graphics processor and rasterizing the triangle polygon to generate a plurality of tiles of pixels related to the graphics primitive (e.g., generate tiles that have at least some coverage from the triangle polygon).

Figure 3:
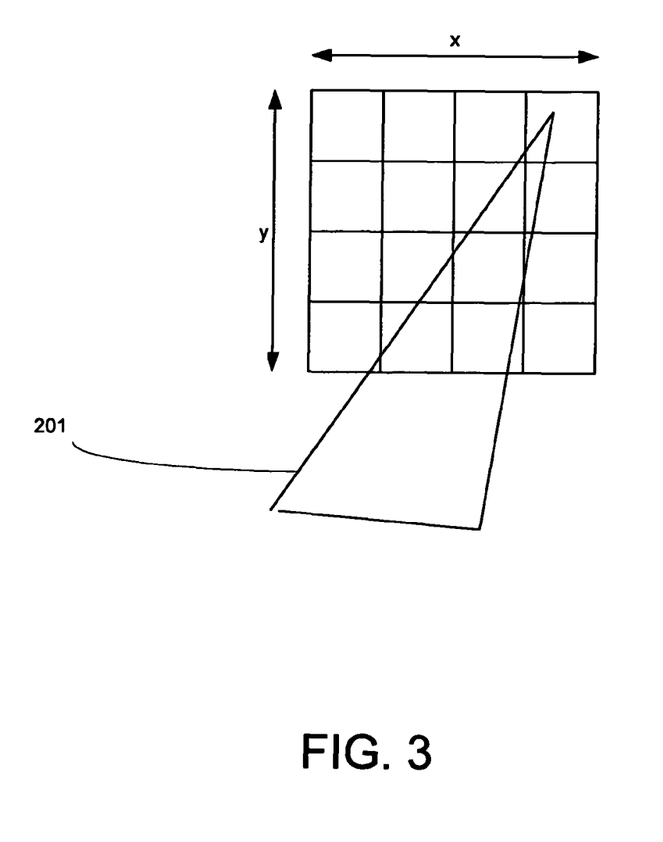
FIG. 3 shows a portion of the triangle being rasterized against a group of tiles in accordance with one embodiment of the present invention.

FIG. 3 shows a portion of the triangle 201 as rasterized against a group of tiles in accordance with one embodiment of the present invention. Generally, the tile based rasterization is performed as a preliminary rasterization step and is intended to quickly determine which pixels of the screen area relate to a given graphics primitive (e.g., triangle 201). Accordingly, relatively large groups of pixels (e.g., tiles) are examined at a time in order to quickly find those pixels that relate to the primitive. The process can be compared to a reconnaissance, whereby a coarse raster unit (e.g., the coarse raster unit 703 shown in FIG. 7) quickly scans a screen area and finds tiles that cover the triangle 201. Thus the pixels that relate to the triangle 201 can be discovered much more quickly than the traditional prior art process which utilizes a single level of rasterization and examines much smaller numbers of pixels at a time, in a more fine-grained manner.

Referring still to FIG. 3, the tile based rasterization, or coarse rasterization, can utilize a number of different types of tile footprints. For example, tiles can be "stamped out" in groups of four, groups of eight, groups of 16, or the like, depending upon the desired level of per clock performance for a given GPU. Accordingly, the 16 tile grid depicted in FIG. 3 could have been stamped out as, for example, four groups of 2×2 tiles, a single group of 4×4 tiles, or the like.

Figure 4:
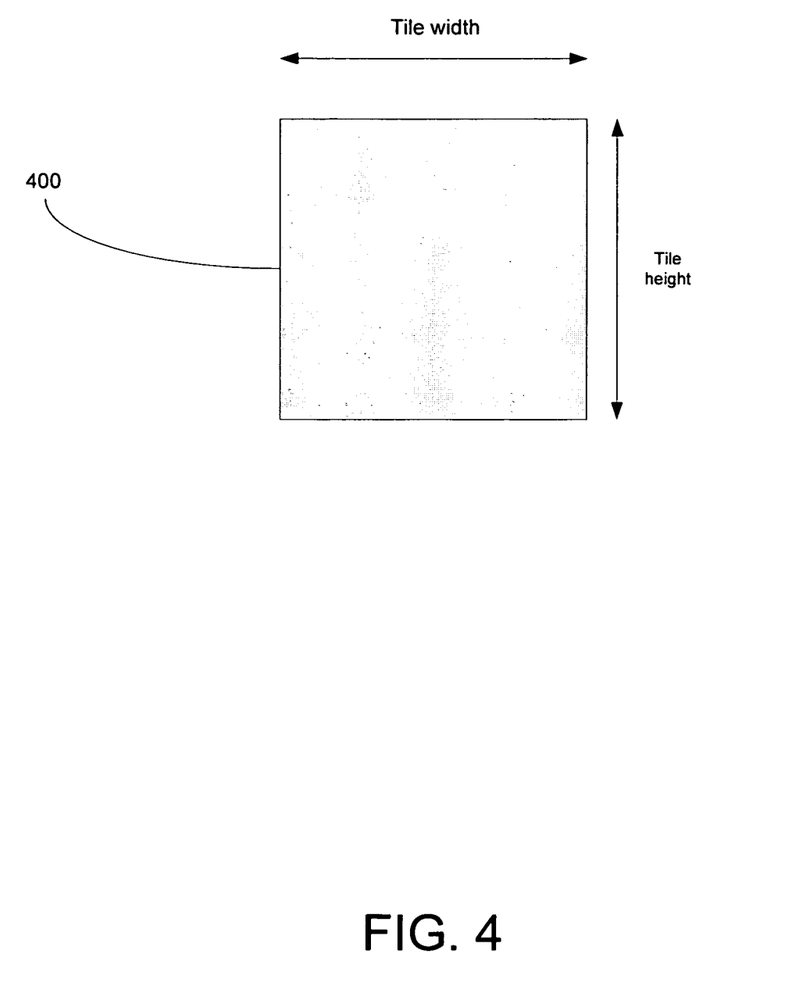
FIG. 4 shows an exemplary tile in accordance with one embodiment of the present invention.

FIG. 4 shows an exemplary tile 400 in accordance with one embodiment of the present invention. Generally, the tile 400 (e.g., as with the tiles along the line of rasterization 202 shown in FIG. 2) is comprised of pixels, where the tile 400 is some number of pixels high and some number of pixels wide (e.g., 8×8, 16×16, 32×32 pixels, etc.). However, in some embodiments, tiles can be comprised of sub-pixel samples. In such an embodiment, the tile 400 would be some number of samples high and some number of samples wide (e.g., as in a case where each pixel includes 8, 16, 32, etc. sample points).

Figure 5:
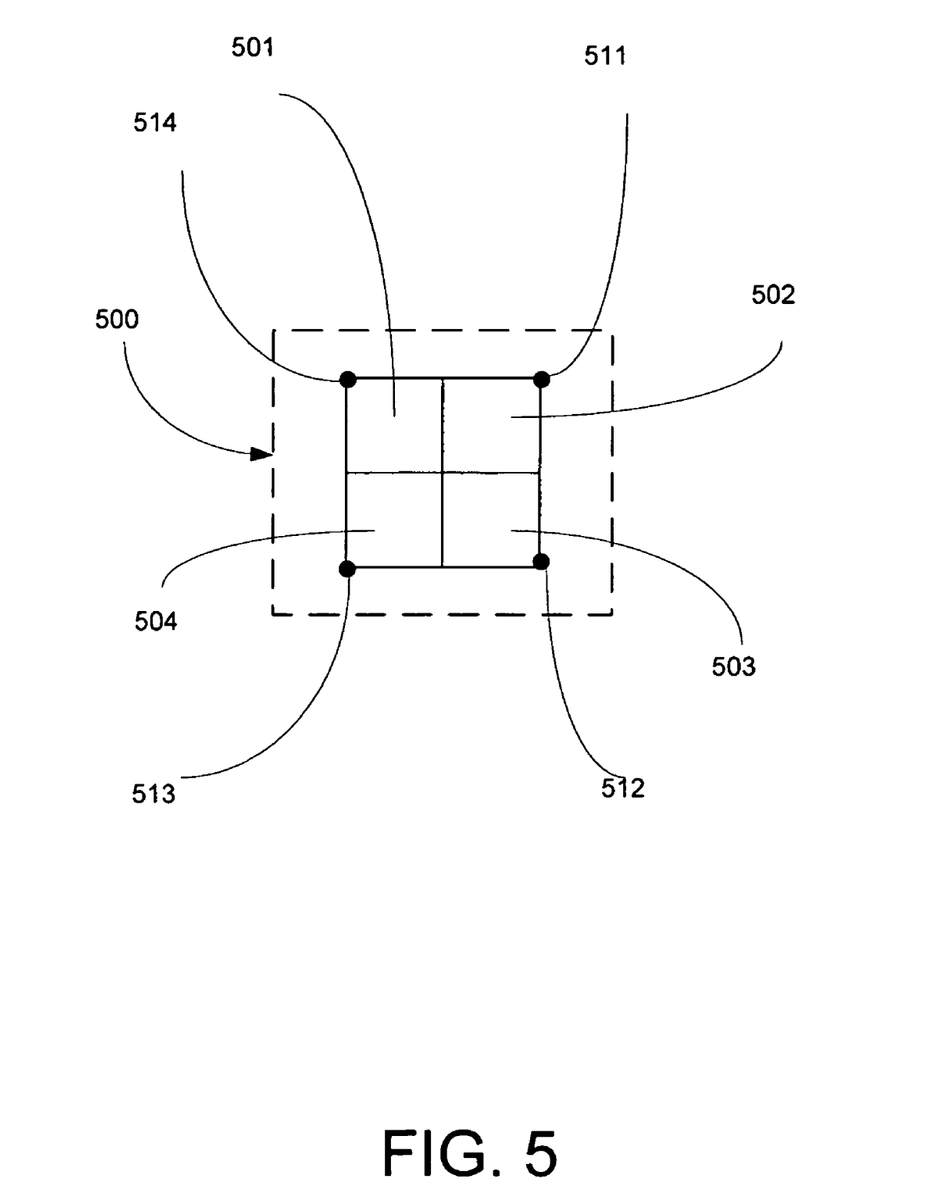
FIG. 5 shows an exemplary sub-tile in accordance with one embodiment of the present invention.

FIG. 5 shows an exemplary sub-tile 500 in accordance with one embodiment of the present invention. As depicted in FIG. 5, the sub-tile 500 further comprises four pixels 501-504. A tile typically comprises a number of sub-tiles (e.g., four sub-tiles per tile, etc.).

As described above, embodiments of the present invention implement a method and system for using low precision evaluation and high precision evaluation for conservative triage of polygon status. The triangle polygon is rasterized to generate a plurality of tiles that have at least some coverage from the triangle polygon (e.g., coarse rasterization) as described above. Subsequently, the tiles are rasterized at a first level precision (e.g., a low precision polygon edge equation evaluation) to generate a plurality of sub-tiles related to the graphics primitive. In the FIG. 5 embodiment, each tile comprises four sub-tiles (e.g., four 2×2 sub-tiles per 8×8 tile, etc.).

As used herein, the precision level refers to the amount of precision used in evaluating a polygon edge equation described by $Ax+By+C=0$. In a polygon edge equation, x and y are terms representing the pixel position, or alternatively, the sample position (typically about 10 to 15 bits), and the terms A, B and C describe the edge equation. At high precision, the terms A, B and C are typically 30 to 40 bits. At low precision, the terms A, B and C are approximated and are typically 15 bits or less. Arithmetic operations carried out at low precision can be computed much more efficiently and require much less silicon area (e.g., logic gates, storage elements, etc.) to implement, and thus consume much less power. Accordingly, it is very advantageous to utilize low precision arithmetic operations on those occasions when high precision is not required.

Referring still to FIG. 5, embodiments of the present invention evaluate the sub-tiles against the triangle polygon at each of their respective corners, such as corners 511-514 of the sub-tile 500. The low precision evaluation at the corners 511-514 allow a rapid determination as to whether the sub-tile 500 has any degree of coverage.

Figure 6:
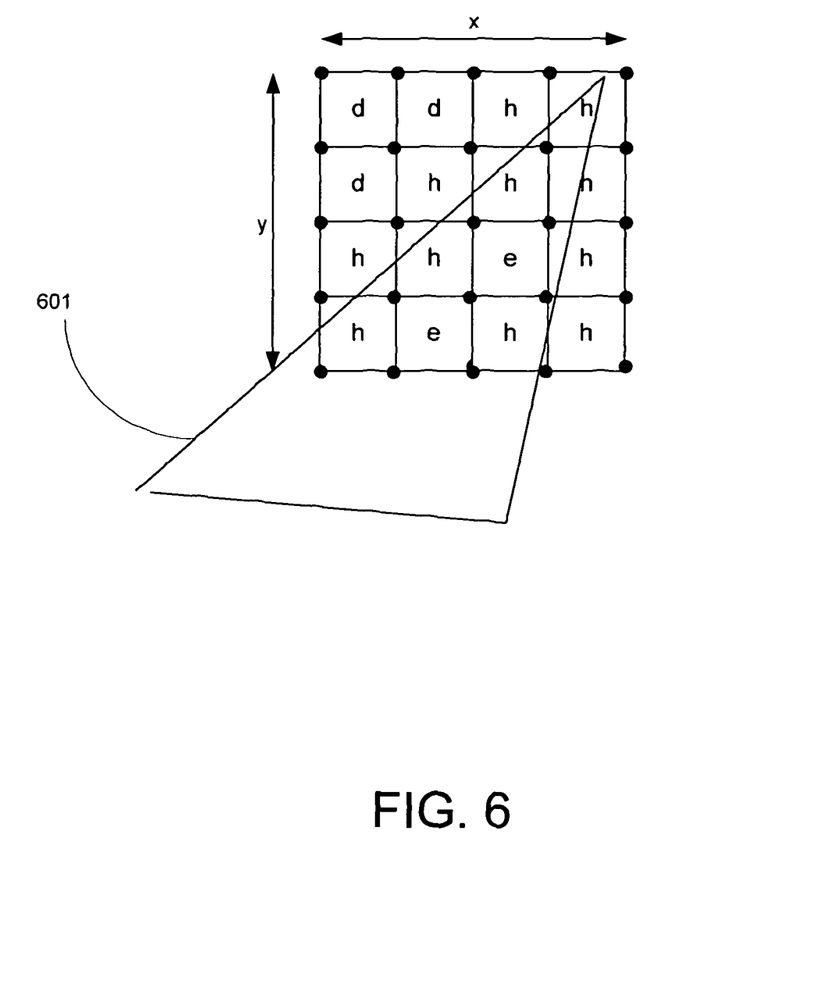
FIG. 6 shows a diagram depicting a triangle being rasterized against a grid of sub-tiles in accordance with one embodiment of the present invention.

FIG. 6 shows a diagram depicting a triangle 601 being rasterized against a grid of sub-tiles in accordance with one embodiment of the present invention. As depicted in FIG. 6, the grid is four sub-tiles high and four sub-tiles wide.

A sub-tile is related to the triangle polygon if at least some portion of the sub-tile is covered by the triangle polygon, and a low precision edge equation evaluation (e.g., at the corners of each sub-tile) is performed to determine such related sub-tiles. In one embodiment, each of the sub-tiles not related to the graphics primitive (e.g., are completely uncovered) are discarded. In one embodiment, sub-tiles that are completely covered are output (e.g., expedited) for rendering operations at a subsequent stage of the graphics processor without undergoing rasterization at the second level (e.g., high precision). The sub-tiles that are partially covered by the graphics primitive are rasterized at the second level precision (e.g., high precision) in order to properly determine which of the pixels (e.g., or alternatively which of the samples) comprising the sub-tiles are covered and which of the pixels (e.g., or samples) are not covered.

This process of determining the status of sub-tiles as described above can be referred to as triage, as in a case where the sub-tiles are sorted for their subsequent treatment (e.g., discarded, expedited, or retained for high precision evaluation). Thus, in the FIG. 6 diagram, the sub-tiles that can be discarded are labeled with a "d", the sub-tiles that can be expedited are labeled with an "e", and the sub-tiles that are retained for high precision evaluation are labeled with an "h".

In one embodiment, the terms of the low precision edge evaluation (e.g., the first level precision) are truncated to ensure a conservative evaluation of the sub-tiles with respect to coverage by the graphics primitive. When reducing the precision of the edges descriptions, instead of conventional rounding, truncation is used so that an edge is pulled slightly toward zero. A zero result is then treated as touching, and thus at least partially covered. As a result, a sub-tile is only declared outside an edge when it is definitely outside. In other words, the results of the edge evaluation equations are evaluated conservatively so that even though low precision evaluation is used, no sub-tile that has any degree of coverage will be incorrectly discarded. Although this has the effect that some sub-tiles that are close to an edge can incorrectly be identified as being partially covered as opposed to being uncovered, such an effect is acceptable in order to prevent possibly discarding partially covered sub-tiles.

In this manner, low precision edge evaluation can be used to rapidly identify those sub-tiles which are completely uncovered, which can be discarded, and those sub-tiles which are completely covered, which can then be expedited to subsequent rendering stages. Partially covered sub-tiles can be reliably identified and fully evaluated using high precision edge evaluation. The use of low precision edge evaluation reduces the amount of GPU hardware required for a given level of rasterization performance. Similarly, the use of low precision edge evaluation in accordance with embodiments of the present invention provides a rasterization process that can scale as graphics application needs require, and provides added performance without incurring penalties such as increased power consumption and/or reduced fabrication yield.

Figure 7:
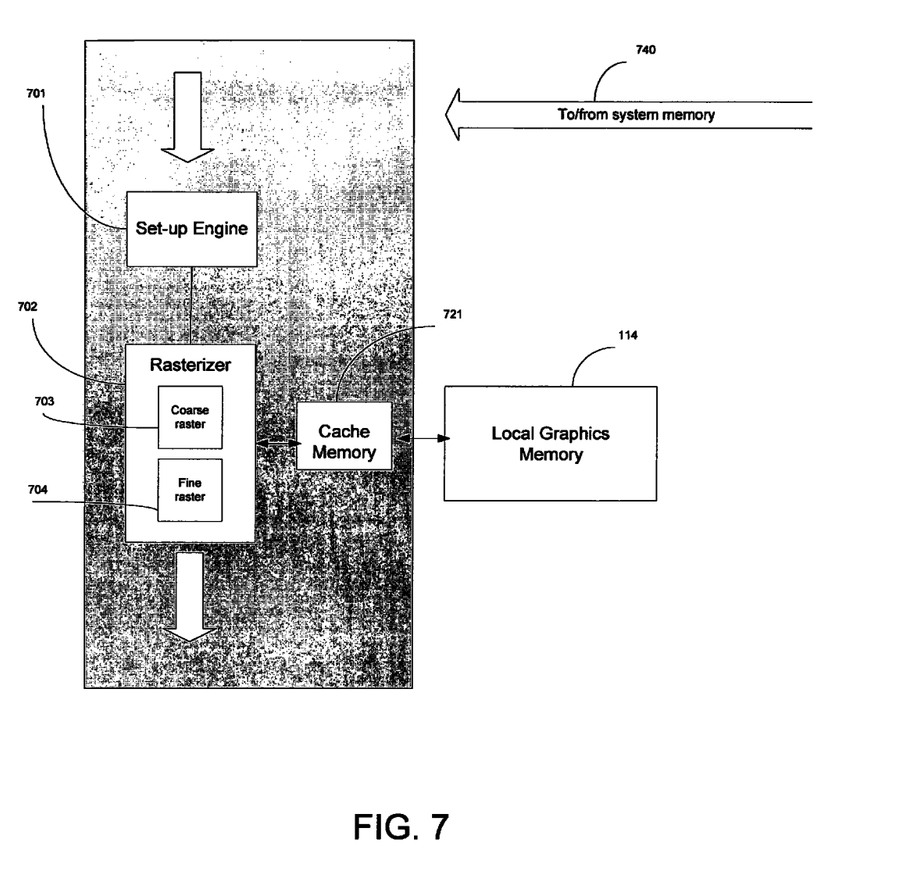
FIG. 7 shows a diagram of internal components of a GPU in accordance with one embodiment of the present invention.

In one embodiment, the process for determining which sub-tiles are related to a given graphics primitive using low precision evaluation and high precision evaluation for triage as described above is implemented within a fine raster unit of a raster stage (e.g., the fine raster unit 704 shown in FIG. 7).

FIG. 7 shows a diagram of internal components of the GPU 110 in accordance with one embodiment of the present invention. As shown in FIG. 7, the GPU 110 includes a setup engine 701 and a rasterizer unit 702. In the present embodiment, the functionality of the present invention is implemented within the hardware and software of the rasterizer unit 702. Generally, the rasterizer unit 702 functions by converting descriptions based on vertices, received from the setup engine 701, to descriptions based on edge descriptions. The rasterizer unit 702 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In the present embodiment, the rasterizer unit 702 includes a coarse raster component 703 and a fine raster component 704. The coarse raster component 703 implements the course rasterization process as described above, as it rapidly searches a grid of tiles to identify tiles of interest (e.g., tiles that are covered by a primitive). Once the tile groups of interest are identified, the fine raster component 704 individually identifies the pixels that are covered by the primitive, in one embodiment, by using low precision evaluation and high precision evaluation for triage as described above. Hence, in such an embodiment, the coarse raster component 703 rapidly searches a grid of pixels by using tiles, and the fine raster component 704 uses the information generated by the coarse raster component 703 and implements fine granularity rasterization by individually identifying pixels covered by the primitive.

Referring still to FIG. 7, the GPU 110 further includes a cache memory 721 that functions by implementing high-speed low latency storage for the most frequently used graphics rendering data. Such data typically comprises texture information, vertex information, colors, and the like. The cache memory 721 is shown coupled to the local graphics memory 114. The cache memory 721 utilizes one or more cache maintenance mechanisms to maintain coherency with the local graphics memory 114. The arrow 740 shows the communications pathway between the GPU 110 and the system memory (e.g., memory 115 shown in FIG. 1).

In one embodiment, the hardware comprising the raster unit 702 is optimized for operations on a per clock basis. For example, to provide high throughput and thereby maintain high rendering frame rates, the coarse raster component 703 and the fine raster component 704 comprise hardware designed to implement the coarse rasterization and the fine rasterization on a per-clock cycle basis. The rasterizer unit 702 can be implemented such that the coarse raster component 703 "stamps out" tiles covering a given primitive within a single clock cycle. Subsequently, the rasterization at the second level precision can be implemented in the fine raster component 704 that stamps out the covered pixels of a tile or of a plurality of sub-tiles in a single clock cycle. Thus for example, hardware that can process 64 pixels per clock would use a 64 pixel footprint (e.g., four tiles of 16 pixels each) while hardware that can process 128 pixels per clock would use a 128 pixel footprint (e.g., eight tiles of 16 pixels each, four tiles of 32 pixels each, etc.).

Figure 8:
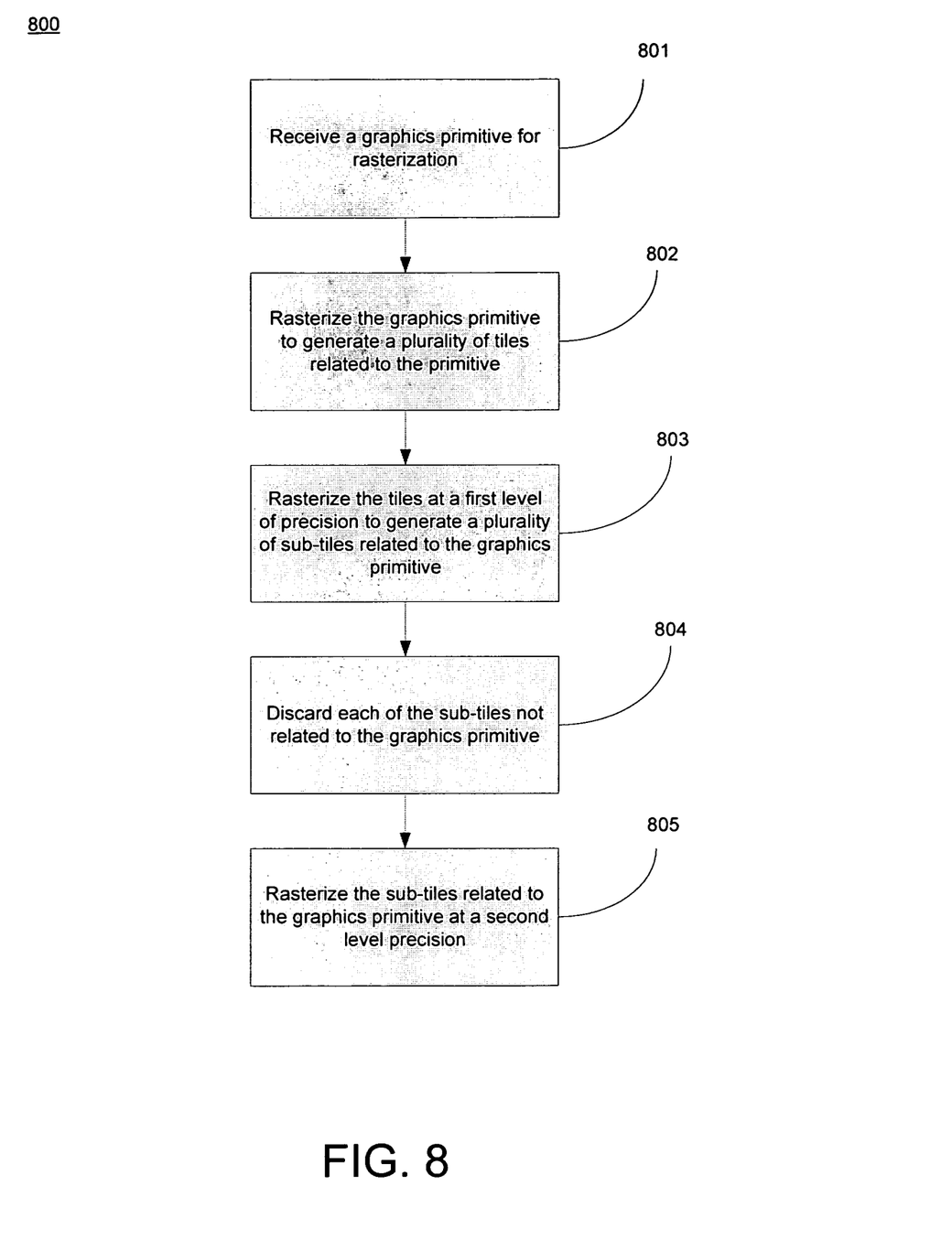
FIG. 8 shows a flow chart of the steps of a rasterization process in accordance with one embodiment of the present invention.

Referring now to FIG. 8, a flow chart of the steps of a rasterization process 800 in accordance with one embodiment of the present invention is shown. Process 800 illustrates the operating steps of a rasterization process implemented in a raster stage of a graphics processor (e.g., GPU 110) using low precision evaluation and high precision evaluation to determine polygon status.

Process 800 begins in step 801, where a raster stage (e.g., rasterizer 702) of a GPU (e.g., GPU 110) receives a graphics primitive for rasterization. In step 802, the graphics primitive is rasterized against a pixel grid to generate a plurality of tiles of pixels related to the graphics primitive. In step 803, the resulting tiles are rasterized at a first level precision to generate a plurality of sub-tiles related to the graphics primitive. As described above, the sub-tiles are evaluated against the graphics primitive at each of their respective corners. In step 804, each of the sub-tiles not related to the graphics primitive are discarded. As described above, the handling of the completely uncovered sub-tiles can be expedited (e.g., by discarding them) since there is no need for any high precision evaluation. In step 805, the sub-tiles related to the graphics primitive are rasterized at a second level precision. In one embodiment, the completely covered tiles can be expedited (e.g., by sending them on for further processing) without high precision evaluation.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a raster stage of a graphics processor, a method for using low precision evaluation and high precision evaluation to determine polygon status, comprising:
  receiving a graphics primitive for rasterization in a raster stage of a graphics processor;
  rasterizing the graphics primitive to generate a plurality of tiles of pixels related to the graphics primitive;
  rasterizing the tiles at a first level precision to generate a plurality of sub-tiles related to the graphics primitive, wherein the sub-tiles are evaluated against the graphics primitive at each of their respective corners;
  discarding each of the sub-tiles not related to the graphics primitive;
  rasterizing the sub-tiles related to the graphics primitive at a second level precision;
  determining whether a partially covered sub-tile exists upon the rasterizing at the first level precision; and
  if a partially covered sub-tile exists rasterizing the partially covered sub-tile at the second level precision to identify pixels of the sub-tile that are covered and pixels of the sub-tile that are not covered wherein a sub-tile rasterized at the second level of precision comprises pixels that are a part of a tile rasterized at said first level of precision;
  wherein the first level precision is a low precision edge evaluation level and the second level precision is a high precision edge evaluation level and wherein the low level precision is truncated to ensure a conservative evaluation of the sub-tiles with respect to coverage by the graphics primitive;
  wherein the low precision edge evaluation level utilizes less than half the number of bits of the high level precision edge evaluation level.

2. The method of claim 1, further comprising:
  determining whether a completely covered sub-tile exists upon the rasterizing at the first level precision; and
  outputting the completely covered sub-tile for rendering operations in a subsequent stage of the graphics processor.

3. The method of claim 2, wherein each respective corner of the completely covered sub-tile is covered by the polygon.

4. The method of claim 1, wherein at least one respective corner of the partially covered sub-tile is not covered by the polygon.

5. The method of claim 1, further comprising:
  determining whether a completely uncovered sub-tile exists upon the rasterizing at the first level precision; and
  discarding the completely uncovered sub-tile.

6. The method of claim 5, wherein each respective corner of the completely uncovered sub-tile is not covered by the polygon.

7. A GPU (graphics processor unit), comprising:
  a set-up unit for generating polygon descriptions;
  a rasterizer unit coupled to the set-up unit for rasterizing the polygon descriptions, wherein the rasterizer unit is configured to receive a polygon for rasterization and rasterize the polygon to generate a plurality of tiles of pixels related to the polygon, rasterize the tiles at a first level precision to generate a plurality of sub-tiles related to the polygon, wherein the sub-tiles are evaluated against the polygon at each of their respective corners, discard each of the sub-tiles not related to the polygon, and rasterize the sub-tiles related to the polygon at a second level precision wherein if a sub-tile is partially covered the sub-tile is rasterized at the second level precision to identify pixels of the sub-tile that are covered and pixels of the sub-tile that are not covered wherein a sub-tile rasterized at the second level of precision comprises pixels that are a part of a tile rasterized at said first level of precision;
  wherein the first level precision is a low precision edge evaluation level and the second level precision is a high precision edge evaluation level and wherein the low level precision is truncated to ensure a conservative evaluation of the sub-tiles with respect to coverage by the graphics primitive;
  wherein the low precision edge evaluation level utilizes less than half the number of bits of the high precision edge evaluation level.

8. The GPU of claim 7, wherein the GPU is further configured to determine whether a completely covered sub-tile exists upon the rasterizing at the first level precision and output the completely covered sub-tile for rendering operations in a subsequent stage of the graphics processor, and wherein the completely covered sub-tile has each of its respective corners covered by the polygon.

9. The GPU of claim 7, wherein the GPU is further configured to determine whether a partially covered sub-tile exists upon the rasterizing at the first level precision and rasterize the partially covered sub-tile at the second level precision, and wherein the partially covered sub-tile has at least one of its respective corners not covered by the polygon.

10. The GPU of claim 7, wherein the GPU is further configured to determine whether a completely uncovered sub-tile exists upon the rasterizing at the first level precision and discard the completely uncovered sub-tile, and wherein the completely uncovered sub-tile has each of its respective corners not covered by the polygon.

11. A computer system, comprising:
  a system memory;
  a central processor unit coupled to the system memory; and
  a graphics processor unit communicatively coupled to the central processor unit;
  a set-up unit within the graphics processor unit for generating polygon descriptions;
  a rasterizer unit within the graphics processor unit that is coupled to the set-up unit for rasterizing the polygon descriptions; and
  a fine raster component within the raster unit, wherein the fine raster rasterizer component is configured to rasterize a graphics primitive to generate a plurality of tiles of pixels related to the graphics primitive, rasterize the tiles at a low precision to generate a plurality of sub-tiles related to the graphics primitive, wherein the sub-tiles are evaluated against the graphics primitive at each of their respective corners, discard each of the sub-tiles not related to the graphics primitive, and rasterize the sub-tiles related to the graphics primitive at a high precision wherein if a sub-tile is partially covered the sub-tile is rasterized at the second level precision to identify pixels of the sub-tile that are covered and pixels of the sub-tile that are not covered,
  wherein the fine raster component is further configured to determine whether a completely covered sub-tile exists upon the rasterizing at the low precision and output the completely covered sub-tile for rendering operations in a subsequent stage of the graphics processor wherein a sub-tile rasterized at the second level of precision comprises pixels that are a part of a tile rasterized at the first level of precision;
  wherein the first level precision is a low precision edge evaluation level and the second level precision is a high precision edge evaluation level and wherein the low level precision is truncated to ensure a conservative evaluation of the sub-tiles with respect to coverage by the graphics primitive;

wherein the low precision edge evaluation level utilizes less than half the number of bits of the high precision edge evaluation level.

12. The computer system of claim 11, wherein the fine raster component is further configured to determine whether a partially covered sub-tile exists upon the rasterizing at the low precision and rasterize the partially covered sub-tile at the high precision, and wherein the partially covered sub-tile has at least one of its respective corners not covered by the polygon.

13. The computer system of claim 11, wherein the fine raster component is further configured to determine whether a completely uncovered sub-tile exists upon the rasterizing at the low precision and discard the completely uncovered sub-tile, and wherein the completely uncovered sub-tile has each of its respective corners not covered by the polygon.

14. The computer system of claim 11, wherein the low precision is truncated to ensure a conservative evaluation of the sub-tiles with respect to coverage by the polygon.

* * * * *